US012199332B2

(12) United States Patent
Tanaka

(10) Patent No.: US 12,199,332 B2
(45) Date of Patent: Jan. 14, 2025

(54) ANTENNA DEVICE FOR VEHICLE

(71) Applicant: YOKOWO CO., LTD., Tokyo (JP)

(72) Inventor: Masato Tanaka, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 353 days.

(21) Appl. No.: 17/310,217

(22) PCT Filed: Jan. 23, 2020

(86) PCT No.: PCT/JP2020/002371
§ 371 (c)(1),
(2) Date: Jul. 27, 2021

(87) PCT Pub. No.: WO2020/158578
PCT Pub. Date: Aug. 6, 2020

(65) Prior Publication Data

US 2022/0059923 A1 Feb. 24, 2022

(30) Foreign Application Priority Data

Jan. 28, 2019 (JP) ................................ 2019-012176

(51) Int. Cl.
*H01Q 13/10* (2006.01)
*H01Q 1/22* (2006.01)
*H01Q 1/32* (2006.01)
*H01Q 9/04* (2006.01)

(52) U.S. Cl.
CPC ................ *H01Q 1/22* (2013.01); *H01Q 1/32* (2013.01); *H01Q 9/04* (2013.01); *H01Q 13/10* (2013.01)

(58) Field of Classification Search
CPC .. H01Q 1/22; H01Q 1/32; H01Q 9/04; H01Q 13/10; H01Q 1/38; H01Q 1/3275
See application file for complete search history.

(56) References Cited

U.S. PATENT DOCUMENTS 3,459,879 A * 8/1969 Gerpheide ............... H01B 7/08 174/117 FF
3,680,147 A * 7/1972 Redlich .................. H01Q 21/10 343/792
4,721,963 A * 1/1988 Nagy ..................... H01Q 13/16 343/714
(Continued)

FOREIGN PATENT DOCUMENTS

CN 108666781 A 10/2018
EP 3043419 A1 * 7/2016 ............ H01Q 1/243
(Continued)

OTHER PUBLICATIONS

International Search Report and Written Opinion mailed on Apr. 7, 2020, received for PCT Application PCT/JP2020/002371, Filed on Jan. 23, 2020, 11 pages including English Translation.
(Continued)

*Primary Examiner* — Hai V Tran
*Assistant Examiner* — Jordan E. DeWitt
(74) *Attorney, Agent, or Firm* — XSENSUS LLP

(57) ABSTRACT

Provided is an antenna device for a vehicle including an antenna base including a bottom surface portion, a circuit board disposed above the bottom surface portion to face the bottom surface portion, and an antenna element disposed on an outer periphery, and forming a slot antenna with a side end of the antenna base being a facing side of a slot.

9 Claims, 8 Drawing Sheets

(56) References Cited

U.S. PATENT DOCUMENTS 5,760,744 A * 6/1998 Sauer ................... H01Q 9/0407 343/700 MS
6,285,326 B1 * 9/2001 Diximus .............. H01Q 9/0407 343/700 MS
6,313,796 B1 * 11/2001 Potin ...................... H01Q 23/00 343/700 MS
7,034,762 B2 * 4/2006 Huang ................... H01Q 21/28 343/702
7,525,490 B2 * 4/2009 Hung ..................... H01Q 5/371 343/702
7,671,810 B2 * 3/2010 Yu ........................... H01Q 5/40 343/702
8,638,265 B2 * 1/2014 Mahanfar .............. H01Q 5/342 343/702
8,854,265 B1 * 10/2014 Yang ...................... H01Q 9/045 343/700 MS
9,825,354 B2 * 11/2017 Hu ........................... H01Q 9/16
10,749,561 B1 * 8/2020 Yuen .................... H04R 1/1008
2002/0175864 A1 * 11/2002 Fang ...................... H01Q 21/28 343/702
2003/0038749 A1 * 2/2003 Chen ...................... H01Q 1/243 343/702
2003/0058172 A1 * 3/2003 Horibe ..................... H01Q 1/38 343/702
2004/0085244 A1 * 5/2004 Kadambi ............... H01Q 5/357 343/700 MS
2004/0200812 A1 * 10/2004 Grewell ............... B23K 26/066 219/121.64
2004/0257283 A1 * 12/2004 Asano .................... H01Q 21/28 343/702
2005/0099338 A1 * 5/2005 Noro ........................ H01Q 1/52 343/846
2005/0206572 A1 * 9/2005 Apostolos ............ H01Q 9/0442 343/744
2006/0038727 A1 * 2/2006 Ikeda ................... H01Q 1/1271 343/713
2006/0077113 A1 * 4/2006 Yuanzhu ................ H01Q 13/10 343/770
2006/0202898 A1 * 9/2006 Li ........................ H01Q 1/1271 343/713
2007/0210976 A1 * 9/2007 Luk ........................ H01Q 5/371 343/793
2008/0094303 A1 * 4/2008 Tseng ................... H01Q 9/0421 343/848
2009/0303133 A1 * 12/2009 Ueki .................... H01Q 9/0421 343/700 MS
2010/0033381 A1 * 2/2010 Liu ........................ H01Q 1/243 343/700 MS
2010/0245184 A1 * 9/2010 Talty .................... H04B 1/3822 343/702
2012/0162047 A1 * 6/2012 Mizuno .................. H01Q 1/243 343/905
2013/0207862 A1 * 8/2013 Farooq ................... H01Q 1/243 343/767
2017/0194709 A1 * 7/2017 Jansson .................. H01Q 13/18
2018/0062256 A1 * 3/2018 Kim ..................... H01Q 13/085
2018/0076529 A1 * 3/2018 Minard .................. H01Q 1/243
2018/0366817 A1 * 12/2018 Sung .................... H01Q 9/0407
2019/0097314 A1 * 3/2019 Rajagopalan .......... H01Q 13/10
2019/0137249 A1 * 5/2019 Tasaki ........................ F42B 3/18
2020/0243960 A1 * 7/2020 Wittmann .............. H01Q 17/00
2022/0037776 A1 * 2/2022 Sung .................... H01Q 1/3275

FOREIGN PATENT DOCUMENTS

| | | | | | |
|---|---|---|---|---|---|
| GB | 2304465 | A | * | 3/1997 | ............... H01Q 1/24 |
| JP | 52-123301 | U | | 9/1977 | |
| JP | 52-126732 | U | | 9/1977 | |
| JP | 53-31938 | A | | 3/1978 | |
| JP | 2002135045 | A | * | 5/2002 | |
| JP | 2004-242034 | | | 8/2004 | |
| JP | 2004242034 | A | * | 8/2004 | |
| JP | 2014168685 | A | * | 9/2014 | ......... A63B 24/0062 |
| JP | 2015-41994 | A | | 3/2015 | |
| WO | WO-2019159924 | A1 | * | 8/2019 | ............. H01Q 1/243 |
| WO | WO-2020158578 | A1 | * | 8/2020 | ............... H01Q 1/22 |

OTHER PUBLICATIONS

Extended European Search Report issued Oct. 5, 2022, in corresponding European Patent Application No. 20747765.4, 8 pp.

* cited by examiner

ANTENNA DEVICE FOR VEHICLE

CROSS-REFERENCE TO RELATED APPLICATIONS

The present application is based on PCT filing PCT/JP2020/002371, filed Jan. 23, 2020, which claims priority to JP 2019-012176, filed Jan. 28, 2019, the entire contents of each are incorporated herein by reference.

TECHNICAL FIELD

The present invention relates to an antenna device for a vehicle including an antenna element that operates as a slot antenna.

BACKGROUND ART

As a method of feeding power to a slot antenna, a method is known in which a transmission line disposed on a circuit board is used (e.g., see Patent Literature 1).

PRIOR ART DOCUMENTS

Patent Literature

Patent Literature 1: Japanese Unexamined Patent Application Publication No. 2015-041994

SUMMARY OF INVENTION

Problems to be Solved by the Invention

In recent years, demand for telematics has risen in an automotive communication field, and an antenna device for a vehicle that meets this demand has been required. It is desired to attempt height reduction of the antenna device for the vehicle from a viewpoint of vehicle design.

In the antenna device for the vehicle, a vehicle roof on which the device is mounted is used as a grounding surface, and hence, a monopole antenna is often used as an antenna element. In the antenna device for the vehicle that meets the demand for telematics, high gain in a horizontal direction is desired. When height of the monopole antenna is reduced to attempt the height reduction of the antenna device for the vehicle, decrease in gain in the horizontal direction might be caused.

To solve such a problem, it is considered that a slot antenna is used as the antenna element to be mounted in the antenna device for the vehicle. However, a conventional method of using the slot antenna has such a problem as follows. When power is fed to the slot antenna by use of a transmission line, a circuit board on which the transmission line is disposed is usually disposed to face a metal plate in which a slot is opened, and hence, height reduction of the antenna device for the vehicle is hindered. When the height reduction of the slot antenna is attempted, an area where the circuit board can be disposed narrows.

An example of an object of the present invention is to provide a new technology for attempting height reduction in an antenna device for a vehicle including a slot antenna.

Solution to the Problems

In accordance with one of some embodiments, there is provided an antenna device for a vehicle comprising:

an antenna base including a bottom surface portion;

a circuit board disposed above the bottom surface portion to face the bottom surface portion; and an antenna element disposed on an outer periphery, and forming a slot antenna with a side end of the antenna base being a facing side of a slot.

According to the aspect of the present invention, height reduction can be attempted in the antenna device for the vehicle including the antenna element forming the slot antenna. The slot antenna with the side end of the antenna base being the facing side of the slot is formed. Consequently, when the bottom surface portion is disposed along a horizontal direction, a longitudinal direction of the slot of the slot antenna also extends along the horizontal direction, and gain in the horizontal direction can be obtained in the slot antenna. The circuit board is disposed to face the antenna base above the bottom surface portion, and hence, height reduction of the antenna device for the vehicle can be attempted.

DESCRIPTION OF EMBODIMENTS

Hereinafter, description will be made as to an example of a suitable embodiment of the present invention with reference to the drawings. Note that the embodiment described hereinbelow does not restrict the invention, and an aspect to which the invention is applicable is not limited to the following embodiment.

Configuration

Figure 1:
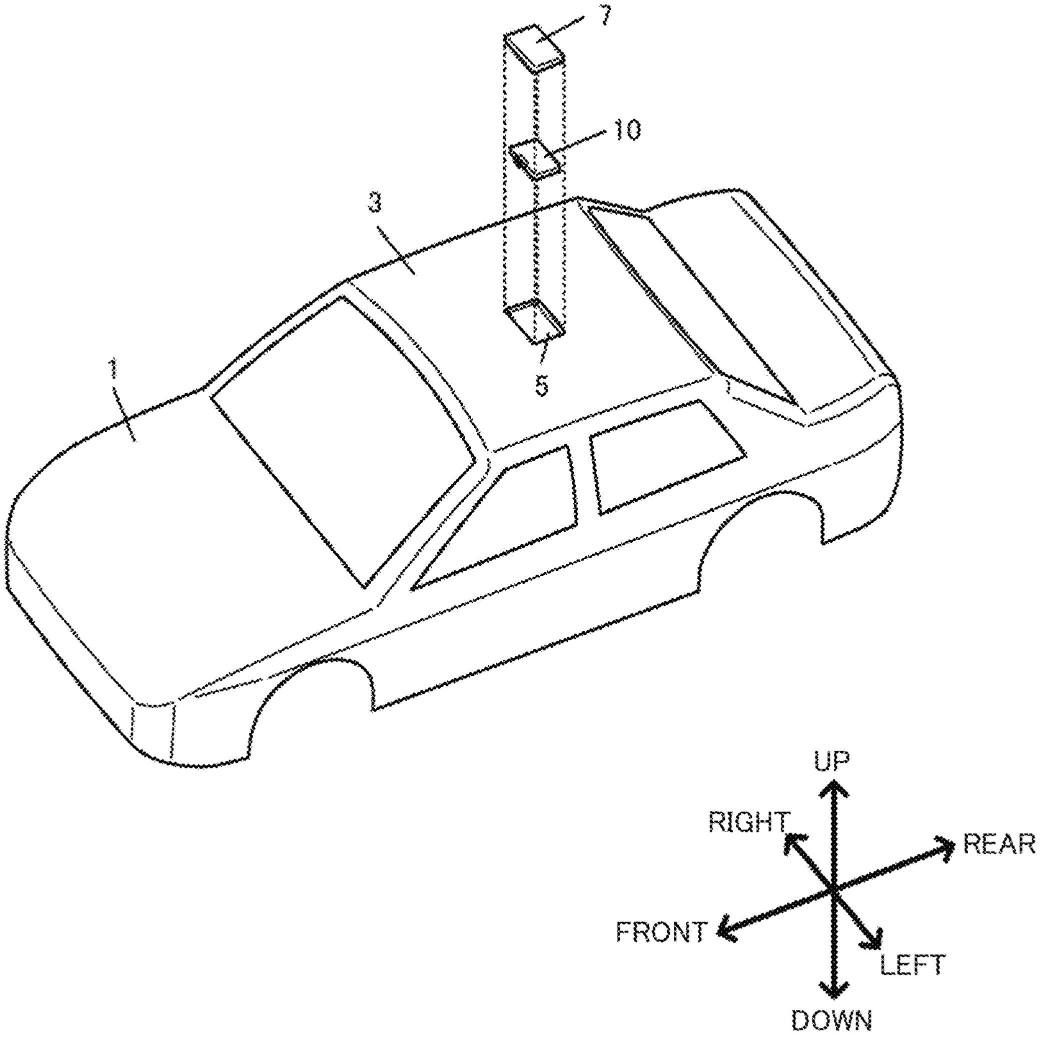
FIG. 1 illustrates an example where an antenna device for a vehicle is attached.

FIG. 1 is a view illustrating an example of a state where an antenna device 10 for a vehicle of the present embodiment is attached to a vehicle 1. As illustrated in FIG. 1, the antenna device 10 for the vehicle is mounted for use to a recess 5 in a roof 3 of the vehicle 1. The antenna device 10 for the vehicle forms a thin rectangular parallelepiped shape entirely having a small thickness (length in a vertical direction), and the roof 3 includes the recess 5 formed to fit the shape of the antenna device 10 for the vehicle. A lid 7 is fitted into the recess 5 in which the antenna device 10 for the vehicle is accommodated, to close an opening of the recess 5. The lid 7 is coated with the same paint as in the roof 3, not to impair vehicle design. Also, the lid 7 fitted in the recess 5 includes an upper surface formed as a flat surface integrally with the roof 3. A waterproofing elastic member such as a packing is mounted to the lid 7, to form a structure where a gap between the lid 7 and the recess 5 is watertightly sealed to prevent water from intruding into the recess 5. Without forming the recess 5 in the roof 3, the antenna device 10 for the vehicle stored in a waterproof case or the like may be mounted for use to a top surface of the roof 3.

An after-mentioned exterior cover 500 of the antenna device 10 for the vehicle may have a function of the waterproof case.

Front-rear, right-left and vertical directions of the antenna device 10 for the vehicle are the same as front-rear, right-left and vertical directions of the vehicle 1 when the antenna device 10 for the vehicle is mounted to the vehicle 1. In the example illustrated in FIG. 1, the antenna device 10 for the vehicle is mounted so that a short direction of the thin rectangular parallelepiped shape coincides with the front-rear direction of the vehicle 1. Specifically, it may be considered that a thickness direction is the vertical direction of the antenna device 10 for the vehicle, a direction along the longitudinal direction is the right-left direction, and a direction along the short direction is the front-rear direction. It may be also considered that the vertical direction is a height direction.

Appearance View

Figure 2:
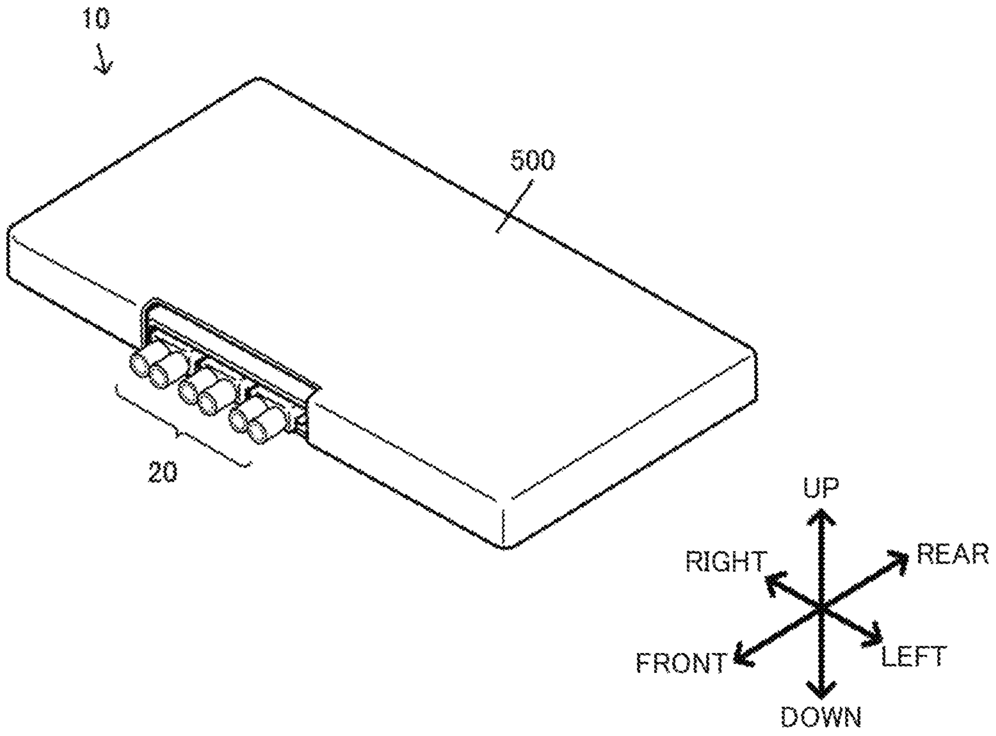
FIG. 2 is an appearance perspective view of the antenna device for the vehicle.
Figure 3:
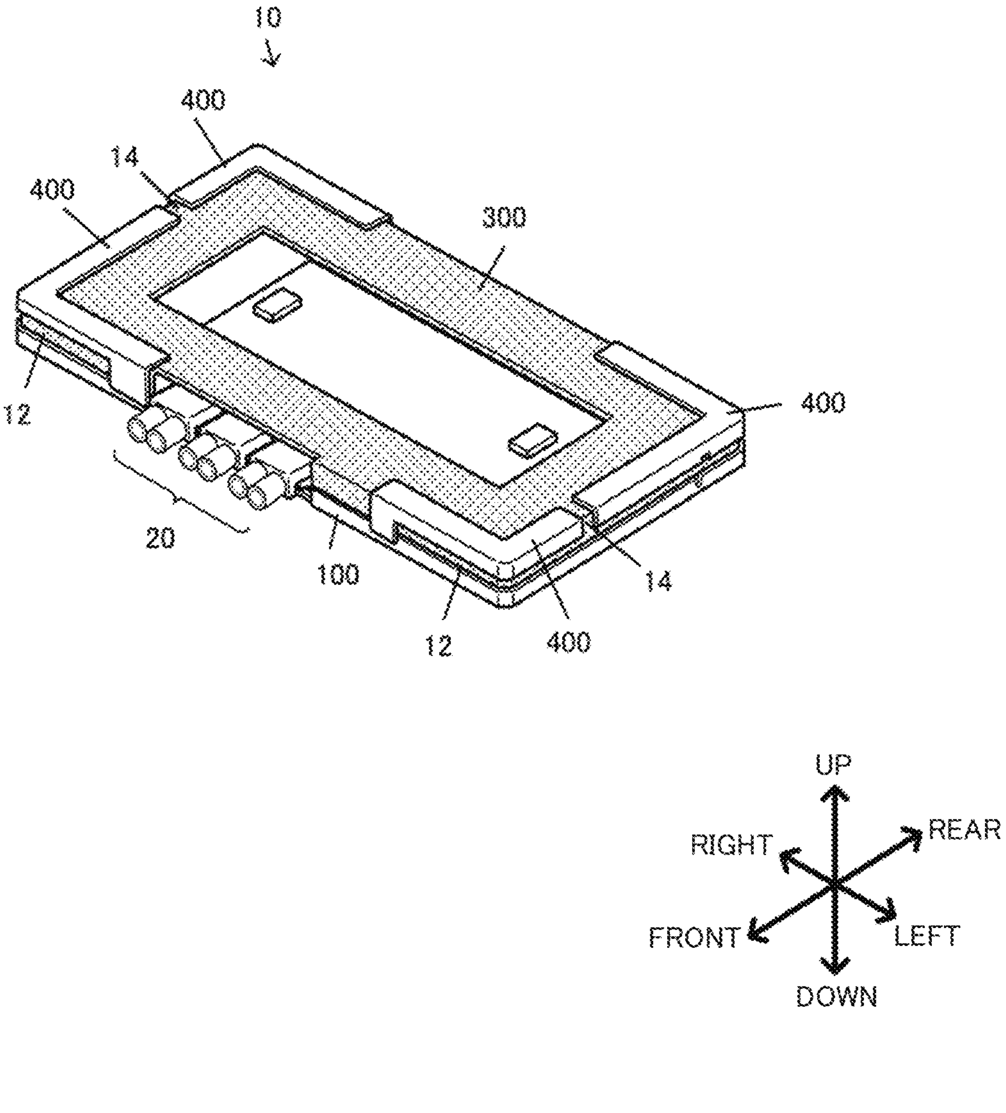
FIG. 3 is an appearance perspective view of the antenna device for the vehicle from which an exterior cover is removed.
Figure 4:
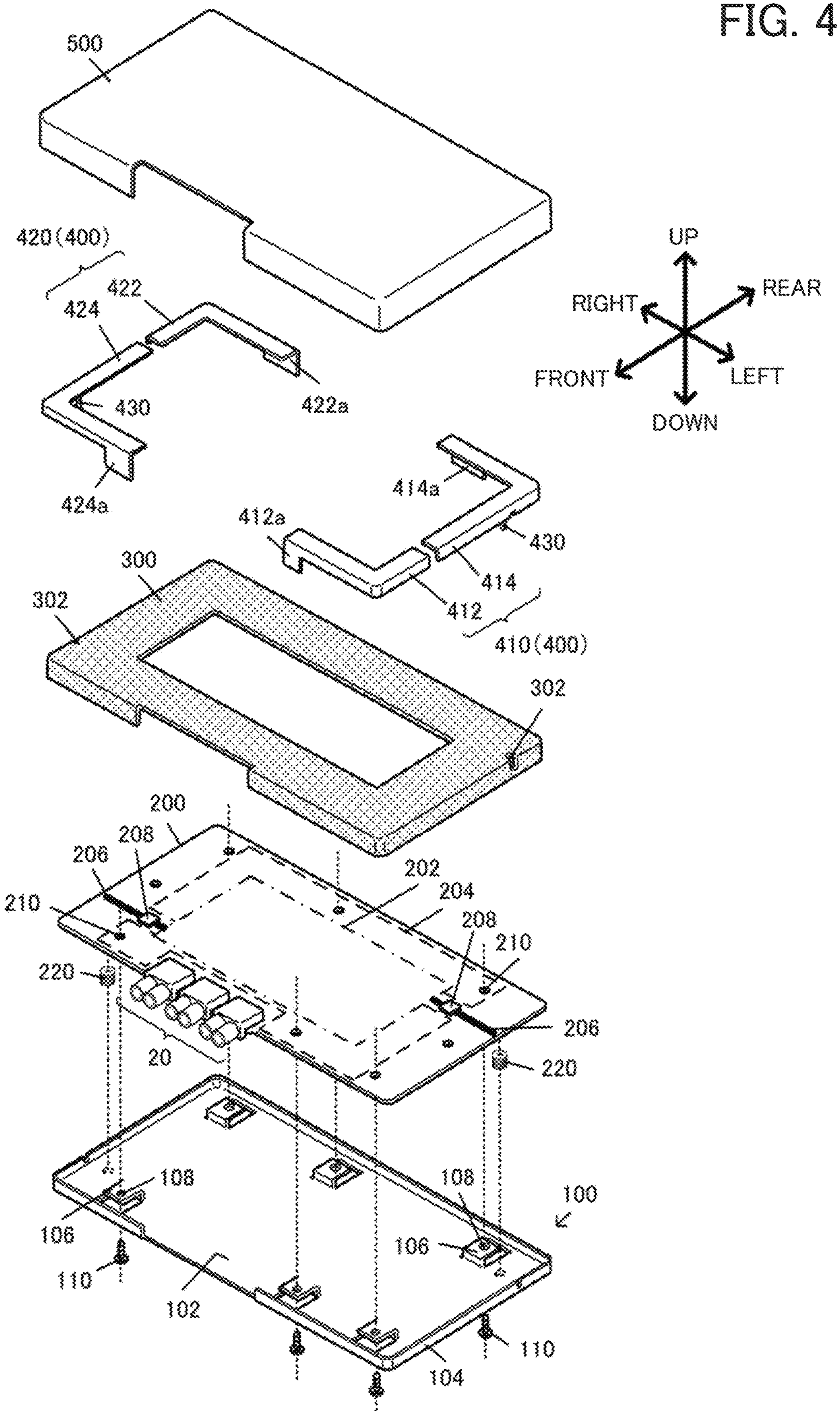
FIG. 4 is an exploded perspective view of the antenna device for the vehicle.
Figure 5:
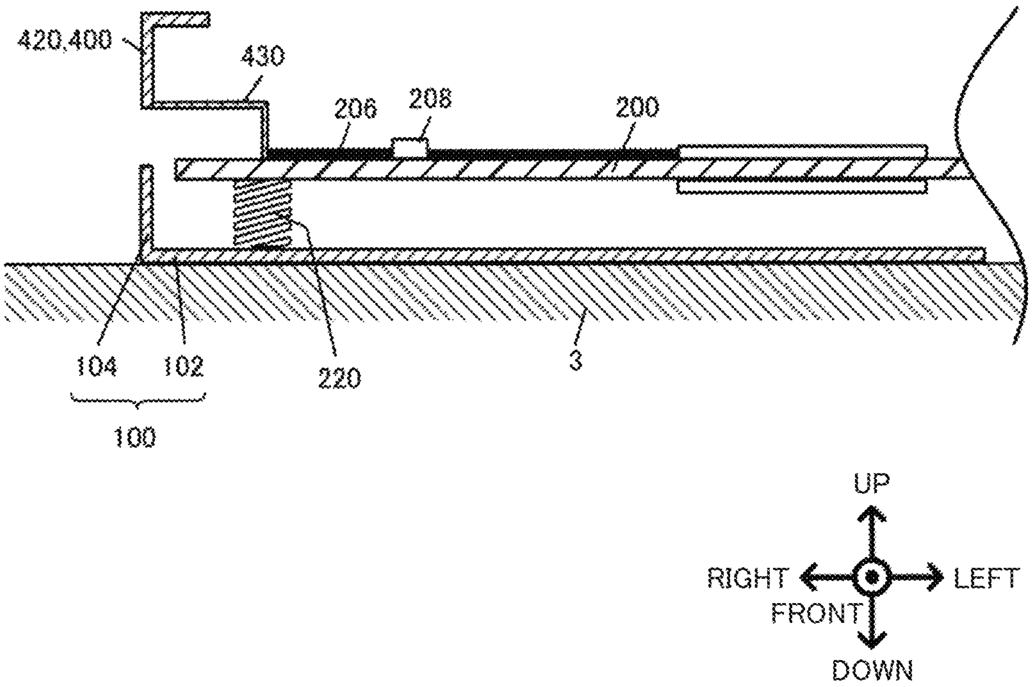
FIG. 5 is a main part sectional view of the antenna device for the vehicle.

FIG. 2 to FIG. 5 are views explaining the configuration of the antenna device 10 for the vehicle. FIG. 2 is an appearance perspective view of the antenna device 10 for the vehicle. FIG. 3 is an appearance perspective view of the antenna device 10 for the vehicle from which the exterior cover 500 is removed. FIG. 4 is an exploded perspective view of the antenna device 10 for the vehicle. FIG. 5 is a main part sectional view of the antenna device 10 for the vehicle along the longitudinal direction, and is a schematic view from which the exterior cover 500 and an intermediate cover 300 are omitted for making an electric connection configuration clearly understandable.

As illustrated in FIG. 3, the antenna device 10 for the vehicle from which the exterior cover 500 is removed includes an antenna element 400 including slots 12 formed to extend in the front-rear direction in respective short side surfaces that are right and left surfaces of the thin rectangular parallelepiped shape. The antenna element 400 is for use in telematics, and is for use, for example, in long term evolution (LTE) communication. The slots 12 are formed to straddle long side surfaces including opposite ends adjacent to each other. The slots 12 have shapes along the horizontal direction along the top surface of the roof 3 that is a grounding surface when the device is mounted to the vehicle 1, and hence, the slots operate as slot antennas for vertical polarization. FIG. 3 is a perspective view, and therefore illustrates only the slot 12 formed in one (left) short side surface for clear understanding. However, the slot 12 is similarly formed in the other (right) short side surface. A length (major axis) of the slot 12 is determined in accordance with a wavelength λ of a frequency for use in operating the slot as the slot antenna. The antenna device 10 for the vehicle of the present embodiment includes the antenna element 400 including the slots 12 formed to extend in the front-rear direction in the short side surfaces, but may include an antenna element including slots formed to extend in the right-left direction in the long side surfaces.

In the antenna element 400, at upper edges of the slots 12, slits 14 extending in an upward direction and having upper ends formed to straddle to an upper surface are made in the short side surfaces. Making the slits 14 can increase the number of the types of frequency bands usable in the antenna device 10 for the vehicle. A length (major axis) of each slit 14 and a position of an opening end of the slit 14 in the slot 12 are determined in accordance with the wavelength λ of the frequency in the usable frequency bands, the number of the types of the usable frequency bands being increased by making the slit 14. The antenna element 400 may be structured not to include the slit 14.

As illustrated in FIG. 2 and FIG. 3, the antenna device 10 for the vehicle includes, in the long side surface on a front side of the thin rectangular parallelepiped shape, a connector portion 20 exposed to connect to a signal cable pulled out from the vehicle 1 to which the antenna device 10 for the vehicle is mounted. The present embodiment includes a configuration where the connector portion 20 is disposed in the long side surface on the front side of the antenna device 10 for the vehicle, but the connector portion 10 for the vehicle may be disposed in another side surface. An analog signal may be outputted from the antenna device 10 for the vehicle to the vehicle 1, or a digital signal may be outputted.

As illustrated in FIG. 4, the antenna device 10 for the vehicle includes a configuration where the circuit board 200, the intermediate cover 300 and the antenna element 400 are accommodated in order from below in a space defined between a metal antenna base 100 and the exterior cover 500 that covers the antenna base 100 from above.

The antenna base 100 includes a metal rectangular bottom surface portion 102, and a metal low edge portion 104 vertically mounted along an outer peripheral edge of the bottom surface portion 102, and forms a rectangular shallow flat plate shape opened upward in top view. In the antenna base 100, a vicinity of a center of the edge portion 104 on the front side is cut out so that the connector portion 20 disposed in the circuit board 200 protrudes forward.

The circuit board 200 is elastically supported by elastic support portions interposed between the antenna base 100 and the circuit board 200, and is disposed to face the bottom surface portion 102 above the bottom surface portion 102. The elastic support portions are, for example, metal springs 220. The springs 220 form one of structures for securing a ground potential when operating the slots 12 as the slot antennas, and are mounted in vicinities of the slots 12. Each spring 220 has an upper end portion mounted on a ground pattern in a lower surface of the circuit board 200. That is, the spring 220 is electrically connected to the ground pattern. When the circuit board 200 is disposed and screwed onto an upper surface of each claw portion 106 of the antenna base 100, the spring 220 has a lower end portion pressed onto an upper surface of the bottom surface portion 102 of the antenna base 100, to elastically support the circuit board 200 to the antenna base 100. Consequently, the spring 220 also performs a function of electrically connecting the ground pattern of the circuit board 200 and the antenna base 100. The spring 220 may be, for example, a coil spring or a leaf spring made of a metal.

In the antenna base 100, a plurality of claw portions 106 having inverted L-shapes in side view are formed by cutting and raising the bottom surface portion 102. Screw holes 108 extending in the vertical direction are formed through the claw portions 106, respectively. The circuit board 200 elastically supported by the springs 220 is located above the claw portions 106. The circuit board 200 is screwed and attached above the antenna base 100 by inserting screws 110 from below into screw holes 108 of the claw portions 106 and screw holes 210 formed in the circuit board 200 to correspond to the screw holes 108, respectively. The circuit board is screwed to generate a space between a lower end of an electronic component of the circuit board 200 supported elastically by the springs 220 and the bottom surface portion 102 so that the electronic component mounted on the lower surface of the circuit board 200 does not contact the bottom surface portion 102. For stably fixing the circuit board 200 onto the antenna base 100, it is desirable to mount the claw portions 106, for example, to vicinities of four corners of the bottom surface portion 102 or positions close to peripheral edges of the bottom surface portion.

When the circuit board 200 is disposed on the antenna base 100, the intermediate cover 300 that covers the circuit board 200 from above is disposed, and the antenna element 400 is disposed on an outer peripheral portion of the intermediate cover 300.

The intermediate cover 300 is made of a synthetic resin having insulation. The intermediate cover 300 entirely forms a rectangular lid shape in top view in which a central portion in the top view is opened. The intermediate cover 300 has a peripheral edge lower portion protruding downward to secure a predetermined space above the circuit board 200 so that the intermediate cover 300 does not interfere with an electronic component mounted on the upper surface of the circuit board 200. An outer peripheral surface of the peripheral edge lower portion is disposed to come into contact with an inner peripheral surface of the edge portion 104 of the antenna base 100. If the peripheral edge lower portion is located on an inner side of the edge portion 104, the outer peripheral surface does not have to contact. Insertion holes 302 through which power feeding elements 430 mounted under a first antenna element 410 and a second antenna element 420 are inserted in the vertical direction are formed on left and right of a peripheral edge portion of the intermediate cover 300, respectively. Also, in the intermediate cover 300, a vicinity of a center of the peripheral edge lower portion on the front side is cut out so that the connector portion 20 disposed in the circuit board 200 protrudes forward.

The antenna element 400 is, for example, a metal member formed by sheet metal processing of a metal plate, and is disposed on the outer peripheral portion of the intermediate cover 300. In a state where the antenna element 400 is disposed on the intermediate cover 300, the slots 12 are formed between the antenna element 400 and the edge portion 104 of the antenna base 100 that faces the antenna element 400. The antenna element 400 includes the first antenna element 410 disposed in a left end portion on a first direction side in planar view seen from above (top plan view), and the second antenna element 420 disposed in a right end portion on a second direction side opposite to the first direction side. Here, an opposite side indicates a direction opposite to a certain direction by 180 degrees, i.e., an opposite direction side. For example, a side opposite to a left surface is a right surface.

The first antenna element 410 includes a part 412 disposed on a front side of a left end portion of the intermediate cover 300, and a part 414 disposed on a rear side. Each of the parts 412 and 414 has an upper surface portion with an L-shape in top view on which the intermediate cover 300 is mounted, and a side surface portion extending downward from an outer edge portion of the upper surface portion. In the side surface portion, in a state where the antenna element is disposed on the outer peripheral portion of the intermediate cover 300, protrusion pieces 412*a* and 414*a* protruding downward on a front side or rear side of the intermediate cover 300 are further formed. The protrusion pieces 412*a* and 414*a* are formed to specify the length (major axis) of the slot 12. In the state where the antenna element is disposed on the outer peripheral portion of the intermediate cover 300, the parts 412 and 414 are formed so that a gap between end portions of the parts forms the slit 14 in the left end portion of the intermediate cover 300. In the present embodiment, in a left surface of the antenna device 10 for the vehicle, an open end of the slit 14 is formed at a position forward from the slot 12, and hence, the part 414 is formed to be longer than the part 412 in the front-rear direction.

In the state where the first antenna element 410 is disposed in the left end portion of the outer peripheral portion of the intermediate cover 300, lower portions of the respective protrusion pieces 412*a* and 414*a* of the parts 412 and 414 come into contact with an upper portion of the edge portion 104 of the antenna base 100, to form the slot 12. The slot 12 is formed to straddle the left surface and adjacent front and rear surfaces in the antenna device 10 for the vehicle, between a lower side of the side surface portion of each of the parts 412 and 414 and an upper side of the edge portion 104 of the antenna base 100 that faces the part. The gap between the parts 412 and 414 forms the slit 14.

The second antenna element 420 is also formed similarly to the first antenna element 410. The slit 14 of the second antenna element 420 is formed at a rearward position. A configuration where the first antenna element 410 is disposed in point symmetry in top view forms the second antenna element 420. That is, the second antenna element 420 includes a part 422 disposed on a rear side of a right end portion of the intermediate cover 300, and a part 424 disposed on a front side. In the respective parts 422 and 424, protrusion pieces 422*a* and 424*a* are formed to specify the length (major axis) of the slot 12.

The power feeding elements 430 are mounted as power feeding structures for operating the slots 12 as the slot antennas to the antenna element 400. For the first antenna element 410, the power feeding element 430 is mounted to the part 414 disposed on the rear side, and for the second antenna element, the power feeding element 430 is mounted to the part 424 disposed on the front side. As illustrated in FIG. 5, the power feeding element 430 is formed in an L-shape in side view. One end portion of the power feeding element 430 is connected to a lower edge of the antenna element 400 so that a cross section of the one end portion is parallel to a plane extending in the vertical direction and front-rear direction. The other end portion of the power feeding element 430 is connected to a power feeding line 206 disposed on the circuit board 200 so that a cross section of the other end portion is parallel to a plane extending in the front-rear direction and right-left direction. A connected position of the power feeding element 430 in the antenna element 400 corresponds to a power feeding position to the slot antenna, and is determined in accordance with the wavelength $\lambda$ of the frequency for use.

The exterior cover 500 is made of a synthetic resin having wave transparency. The exterior cover 500 is a lid that covers an entire upper part of the antenna device 10 for the vehicle. A central part of a front surface of the exterior cover 500 is cut out so that the connector portion 20 disposed in the circuit board 200 protrudes forward. The exterior cover 500 is formed so that an inner dimension of the cover is slightly larger than an outer dimension of the antenna base 100. The circuit board 200, the intermediate cover 300 and the antenna element 400 are arranged in order above the antenna base 100, and then, the exterior cover 500 is attached to cover the whole device from above.

Figure 6:
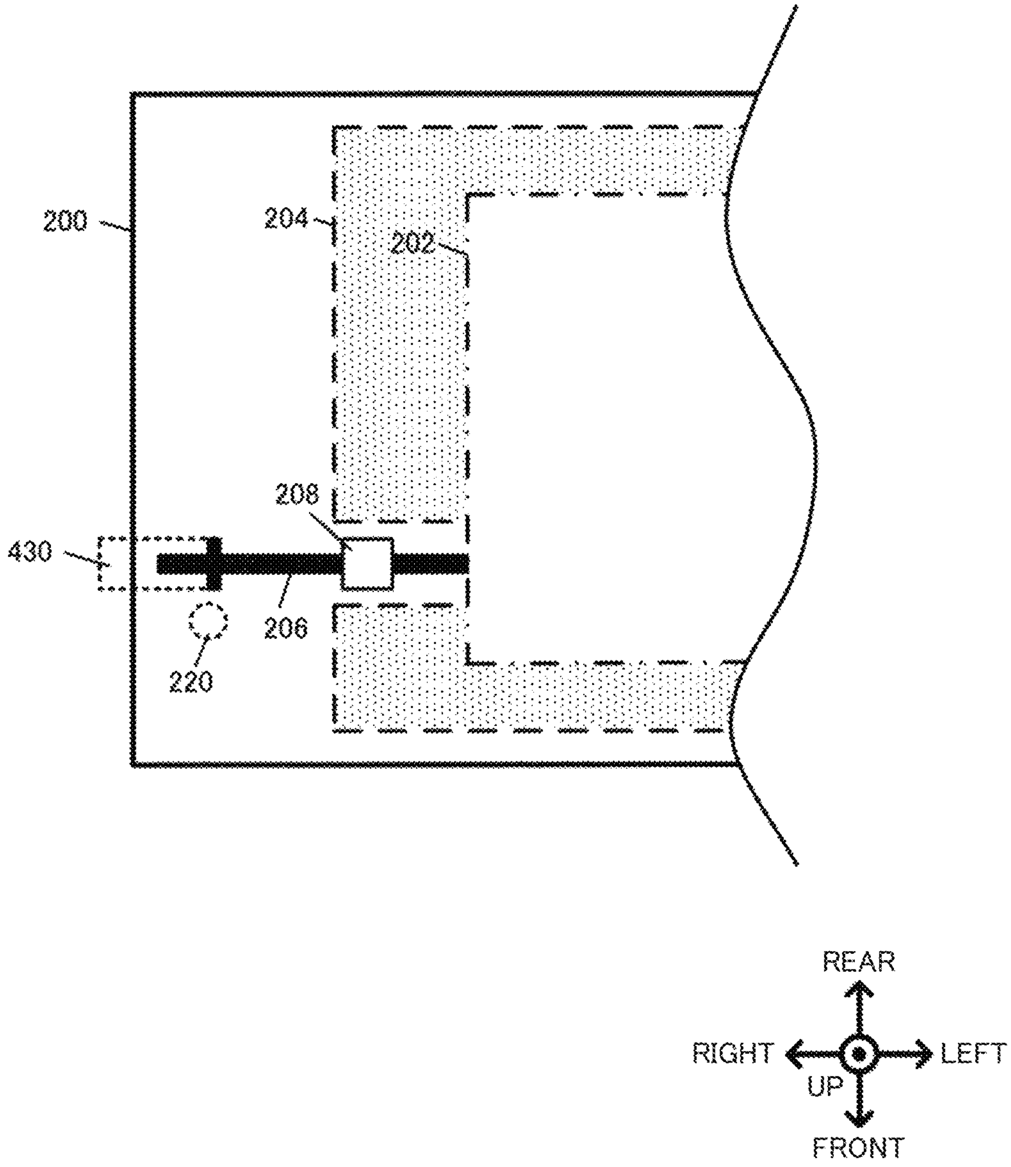
FIG. 6 is a top plan view of a circuit board.
Figure 7:
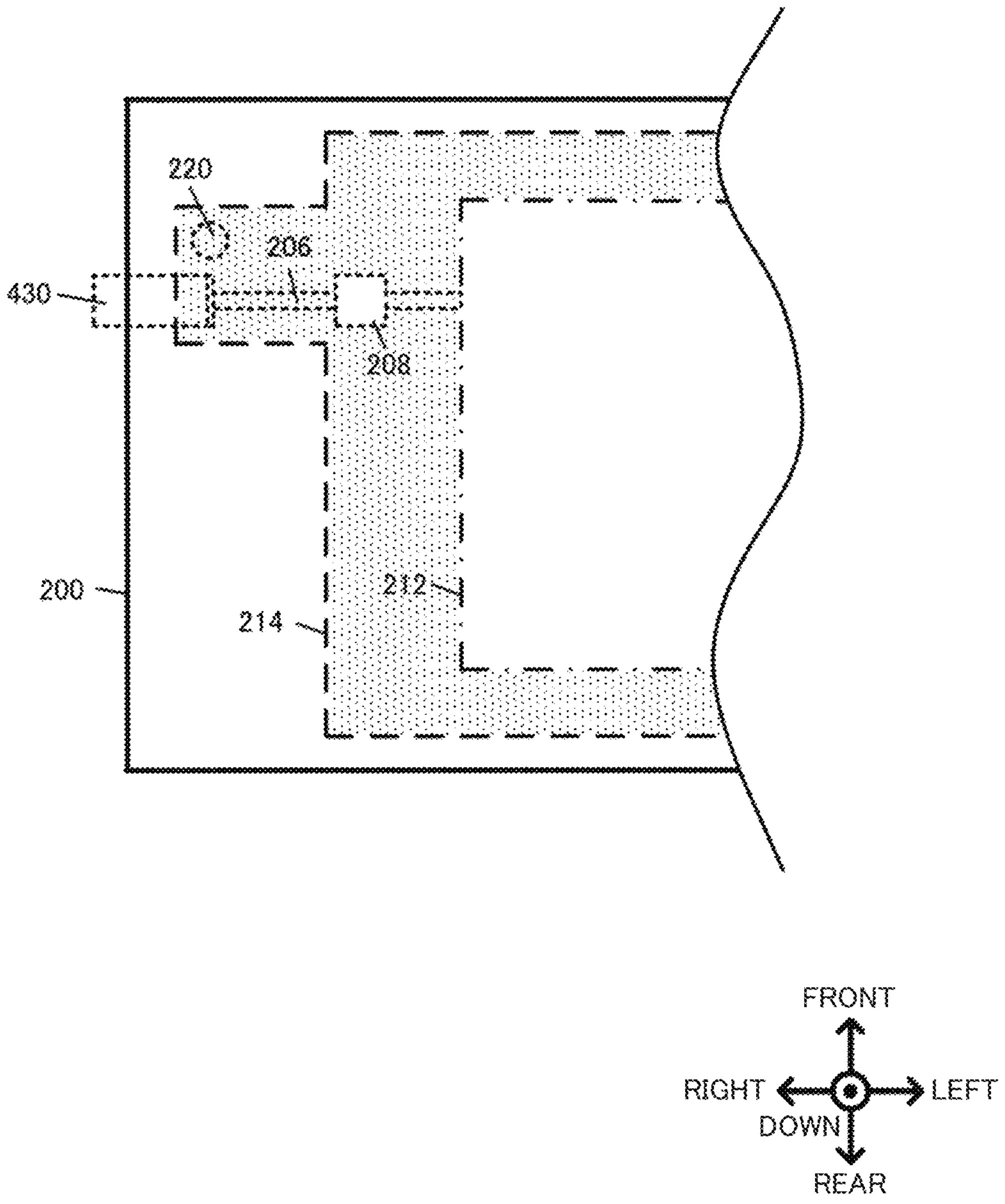
FIG. 7 is a bottom plan view of the circuit board.

The circuit board 200 is a double-sided board having upper and lower surfaces to which electronic components are mounted. FIG. 6 is a view for explaining a wiring structure in the upper surface of the circuit board 200, and is a plan view schematically illustrating a part of the circuit board 200 seen from above. FIG. 7 is a view for explaining a wiring structure in the lower surface of the circuit board 200, and is a plan view schematically illustrating a part of the circuit board 200 seen from below. FIG. 6 and FIG. 7 illustrate a right end portion of the circuit board 200, but a left end portion also has a similar structure.

As illustrated in FIG. 6, in the upper surface of the circuit board 200, a central portion in planar view is formed as an electronic circuit arrangement portion 202, and a ground pattern 204 and the power feeding line 206 for the slot antenna are arranged to surround an outer side of the electronic circuit arrangement portion 202. In the electronic circuit arrangement portion 202, various electronic circuits for the antenna including a power feeding circuit, another antenna element such as a patch antenna and a signal processing circuit are arranged.

FIG. 6 illustrates arrangement of the power feeding element 430 by a dotted line. In the upper surface of the circuit board 200, the power feeding line 206 extends from the electronic circuit arrangement portion 202 to a vicinity of an edge of the circuit board 200 that is in contact with a lower end of the power feeding element 430. For connection of the power feeding line 206 and the power feeding element 430, for example, a configuration may be adopted where an outlet through which the lower end of the power feeding element 430 is inserted into the power feeding line 206 is made in the circuit board 200, and the lower end of the power feeding element 430 is inserted into the outlet to connect to the power feeding line 206. The connection of the power feeding line 206 and the power feeding element 430 may be performed by soldering. Any configuration may be adopted as long as both can be electrically connected.

An antenna matching circuit 208 is mounted to a middle of the power feeding line 206. The antenna matching circuit 208 is disposed close to a connected portion between the power feeding line 206 and the power feeding element 430. The antenna matching circuit 208 is a circuit for performing impedance matching between the antenna element 400 and a post-stage circuit connected via the power feeding line 206. The antenna matching circuit 208 can increase the number of frequency bands usable in the antenna device 10 for the vehicle.

The ground pattern 204 is formed in a region other than the electronic circuit arrangement portion 202, excluding an arrangement region of the power feeding line 206, the antenna matching circuit 208 and the like, and further excluding a non-grounded region. The non-grounded region is a region within a predetermined distance from an edge portion where the antenna element 400 is located, and is a region formed to dispose the antenna element 400 away from the ground pattern 204 by the predetermined distance or more. The predetermined distance is determined in accordance with the wavelength λ of the frequency in the frequency bands usable in the antenna device 10 for the vehicle. The ground pattern 204 is formed as a so-called solid pattern in which the whole region is formed as a planar ground electrode, for noise countermeasures.

As illustrated in FIG. 7, similarly in the lower surface of the circuit board 200, a central portion in planar view is formed as an electronic circuit arrangement portion 212, and a ground pattern 214 is disposed to surround an outer side of the electronic circuit arrangement portion 212. The electronic circuit arrangement portion 212 is formed in a region that almost overlaps with the electronic circuit arrangement portion 202 in the upper surface of the circuit board 200 in planar view. The ground pattern 214 extends to the vicinity of the edge of the circuit board 200 to further include a region corresponding to the arrangement region of the power feeding line 206, the antenna matching circuit 208 and the like in the upper surface of the circuit board 200, in addition to the region that almost overlaps with the ground pattern 204 in the upper surface of the circuit board 200 in planar view. The spring 220 is mounted to the extending region of the ground pattern 214. It is desirable that a mounted position of the spring 220 is a position corresponding to or close to a connected position between the power feeding element 430 and the power feeding line 206 in the upper surface of the circuit board 200. Specifically, it is desirable that an interval between an upper surface position that is the connected position between the power feeding element 430 and the power feeding line 206 in the upper surface of the circuit board 200 and a lower surface position that is the mounted position of the spring 220 in the lower surface of the circuit board 200 is 3 cm or less. The ground pattern 204 in the upper surface of the circuit board 200 is electrically connected to the ground pattern 214 in the lower surface via through holes made in a plurality of arbitrary portions, and the ground pattern 204 and the ground pattern 214 are equally set to the ground potential.

As described above, power is fed from the circuit board 200 to the antenna element 400 including the upper edges of the slots 12 via the power feeding elements 430 connected to the antenna element 400 and the power feeding lines 206 connected to the power feeding elements 430. The ground pattern 214 in the lower surface of the circuit board 200 is electrically connected to the edge portion 104 of the antenna base 100 including a lower edge of the slot 12 via the antenna base 100 and the spring 220 that are both made of the metal, and is grounded. Consequently, the slots 12 operate as the slot antennas.

The circuit board 200 is disposed between the antenna base 100 and the intermediate cover 300. As described above, the circuit board 200 is elastically supported by the springs 220, and fixed above the claw portions 106 to keep an interval from the antenna base 100. Consequently, the circuit board 200 is fixed and disposed, so to speak to float in the air, and a space with a predetermined height is secured between the circuit board 200 and the antenna base 100 below. Therefore, interference with the electronic component mounted on the lower surface of the circuit board 200 is suppressed. A space with a predetermined height is secured by the intermediate cover 300 above the circuit board 200. Consequently, interference with the electronic component mounted on the upper surface of the circuit board 200 is suppressed.

Operations and Effects

The antenna device 10 for the vehicle includes the antenna element 400 in which the slot 12 with the edge portion 104 of the metal antenna base 100 being the facing side of the slot 12 is formed. Consequently, when the antenna base 100 is disposed along a horizontal direction, a longitudinal direction of the slot 12 is also a direction along the horizontal direction, and the slot 12 can operate as the slot antenna for vertical polarization. The power is fed from the power feeding line 206 disposed in the circuit board 200 to the antenna element 400 via the power feeding element 430. The circuit board 200 is disposed between the antenna base 100 and the intermediate cover 300, to face the antenna base 100, and hence, height reduction of the antenna device 10 for the vehicle can be attempted while securing a sufficient circuit board area.

As a power feeding method to the slot antenna, a method using a coaxial cable is known. In a case of feeding power to the slot antenna by use of the coaxial cable, a core wire of the coaxial cable is directly connected to a metal plate including a slot formed therein to feed the power. Consequently, an antenna matching circuit for the slot antenna cannot be loaded, and it is difficult to increase the number of the frequency bands usable in the antenna device for the vehicle. In the antenna device for the vehicle that is for use in telematics, communication in a plurality of types of frequency bands such as long term evolution (LTE) communication or vehicle to X (V2X) communication is performed, and hence, it is desired to increase the number of the frequency bands usable in the antenna device for the vehicle.

In the antenna device 10 for the vehicle of the present embodiment, the antenna matching circuit 208 is disposed in the circuit board 200, and hence, the number of the frequency bands usable in the antenna device 10 for the vehicle can be increased. Thus, according to the present embodiment, the number of the frequency bands usable in the antenna device 10 for the vehicle can be increased in the antenna device 10 for the vehicle including the antenna element 400 forming the slot antenna.

Note that the embodiment to which the invention is applicable is not limited to the above described embodiment, and needless to say, the invention can be suitably changed without departing from the scope of the invention.

(A) Spring

Figure 8:
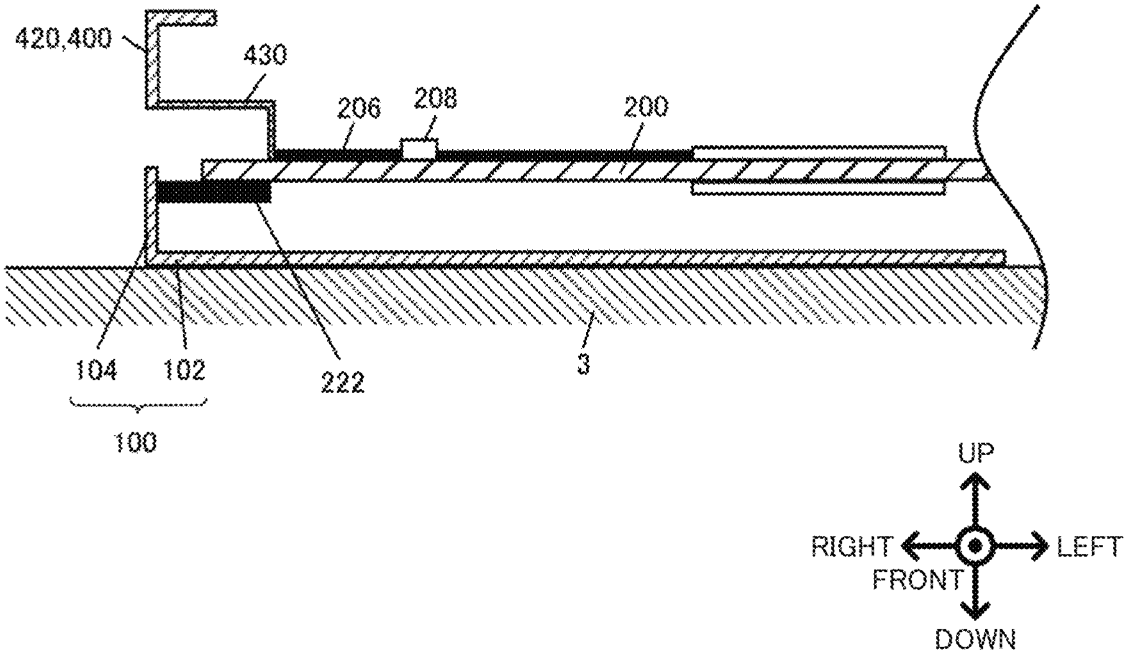
FIG. 8 is a main part sectional view of the antenna device for the vehicle illustrating another example of a spring.

For example, the configuration where the spring 220 is mounted to be interposed between the bottom surface portion 102 of the antenna base 100 and the circuit board 200 may be a configuration illustrated in FIG. 8.

FIG. 8 is a view illustrating another mounting example of the spring, is a main part sectional view along the longitudinal direction of the antenna device 10 for the vehicle similarly to the main part sectional view illustrated in FIG. 5, and is a schematic view from which the exterior cover 500 and the intermediate cover 300 are omitted for making the electric connection configuration clearly understandable. In the example illustrated in FIG. 8, one end of a spring 222 is mounted to a region where the ground pattern 214 is formed in the lower surface of the circuit board 200, and the other end of the spring 222 is connected to the edge portion 104 of the antenna base 100. A connected position between the edge portion 104 and the spring 222 is desirably a position close to the lower edge of the slot 12, i.e., an upper edge of the edge portion 104. The spring 222 can be mounted, for example, in a right angle form. In this case, the one end of the spring 222 is fixed and mounted to the circuit board 200 in the right angle form, and during assembling of the antenna device, the other end of the spring 222 is connected to the edge portion 104 of the antenna base 100 by soldering.

(B) Overall Shape of Device

It is described above that an overall shape of the antenna device 10 for the vehicle is the thin rectangular parallelepiped shape, and the shape may be a polygonal shape in top view, or another shape such as a columnar shape or an elliptical pillar shape.

(C) Number of Antennas

It is described above that the antenna device 10 for the vehicle includes two slot antennas, but the device 10 for the vehicle may include three or more slot antennas. For example, the slot antennas may be arranged and formed also in the front surface and rear surface, or two or more slot antennas may be formed in one side surface.

(D) Power Feeding Element

It is described above that one end portion of the power feeding element 430 formed in the L-shape in side view is connected to the lower edge of the antenna element 400 so that the cross section of the one end portion is parallel to the plane extending in the vertical direction and front-rear direction. The other end portion is connected to the power feeding line 206 disposed on the circuit board 200 so that the cross section of the other end portion is parallel to the plane extending in the front-rear direction and right-left direction. However, the one end portion of the power feeding element 430 formed in the L-shape in the side view may be connected to the lower edge of the antenna element 400 so that the cross section of the one end portion is parallel to the plane extending in the front-rear direction and right-left direction. In this case, the other end portion of the power feeding element 430 is connected to the power feeding line 206 so that the cross section of the other end portion is parallel to the plane extending in the vertical direction and front-rear direction. Alternatively, one end portion of the power feeding element 430 formed in the L-shape in the side view may be connected to an upper surface portion of the antenna element 400 so that the cross section of the one end portion is parallel to the plane extending in the vertical direction and right-left direction. In this case, the other end portion of the power feeding element 430 is connected to the power feeding line 206 so that the cross section of the other end portion is parallel to the plane extending in the vertical direction and front-rear direction.

It is described above that the power feeding element 430 is formed in the L-shape in the side view, but the power feeding element 430 may have any shape as long as a length of the element is short. For example, in a case where the power feeding element 430 is a linear flat plate, the power feeding element 430 may be disposed in parallel with the vertical direction, one end portion of the power feeding element 430 may be connected to the upper surface portion of the antenna element 400, and the other end portion may be connected to the power feeding line 206. A connected portion between the one end portion of the power feeding element 430 and the upper surface portion of the antenna element 400 may be or does not have to be in the vicinity of the slit 14.

It is described above that the power feeding element 430 is mounted to the antenna element 400, but the power feeding element 430 may be mounted to the power feeding line 206.

(E) Antenna Base

It is described above that the antenna base 100 includes the bottom surface portion 102 and the edge portion 104, but the antenna base 100 may include only the bottom surface portion 102. In this case, in a state where the antenna element 400 is disposed on the intermediate cover 300, the slot 12 is formed between the antenna element 400 and a side end (edge) of the bottom surface portion 102 of the antenna base 100 that faces the element.

Disclosure content of the present description can be summarized as follows.

In accordance with one of some embodiments, there is provided an antenna device for a vehicle comprising:

an antenna base including a bottom surface portion;

a circuit board disposed above the bottom surface portion to face the bottom surface portion; and an antenna element disposed on an outer periphery, and forming a slot antenna with a side end of the antenna base being a facing side of a slot.

According to the present aspect, height reduction can be attempted in the antenna device for the vehicle including the antenna element forming the slot antenna. The slot antenna with the side end of the antenna base being the facing side of the slot is formed. Consequently, in a case where the bottom surface portion is disposed along a horizontal direction, a longitudinal direction of the slot of the slot antenna also extends along the horizontal direction, and gain in the horizontal direction can be obtained in the slot antenna. The circuit board is disposed to face the antenna base above the bottom surface portion, and hence, the height reduction of the antenna device for the vehicle can be attempted.

The circuit board may include the antenna matching circuit, and the antenna matching circuit may be disposed close to a power feeding portion of the antenna element.

Thus, the antenna matching circuit can be disposed close to the power feeding portion of the antenna element. Consequently, transmission loss between the slot antenna and the antenna matching circuit can be decreased, and antenna properties of the slot antenna can be satisfactorily kept.

The antenna element may include:

a first antenna element disposed on a first direction side; and a second antenna element disposed on a second direction side opposite to the first direction side.

Thus, two slot antennas can be arranged in the antenna device for the vehicle, and the two slot antennas face opposite sides. Consequently, mutual interference with the two slot antennas can be suppressed.

The circuit board may include a power feeding line, an electronic circuit arrangement portion, and a ground pattern, and the power feeding line electrically may connect the electronic circuit arrangement portion and the antenna element.

Thus, the power feeding line, the electronic circuit arrangement portion and the ground pattern may be arranged in the circuit board. Consequently, effects can be obtained that influence of noise from outside is hard to be exerted and that noise emission to the outside is suppressed.

The antenna device for the vehicle may further comprise:

an elastic support portion that elastically supports the circuit board to the bottom surface portion.

Thus, the elastic support portion can elastically support the circuit board to the bottom surface portion. The electronic circuit is often mounted on the upper surface of the circuit board, and both surfaces of the circuit board can be supported, so to speak in a floated state. Consequently, the electronic circuits can be mounted on both the surfaces of the circuit board.

The elastic support portion may be made of a metal, and the ground pattern of the circuit board and the antenna base may be electrically connected via the elastic support portion.

Consequently, the ground pattern of the circuit board can be electrically connected to the antenna base via the elastic support portion made of the metal.

The interval between the power feeding portion of the antenna element and the portion where the circuit board and the elastic support portion come into contact with each other may be 3 cm or less.

Consequently, in a case where the power feeding portion of the antenna element is located close to the portion where the circuit board and the elastic support portion come into contact with each other and the portions are grounded via the elastic support portion, antenna properties of the slot antenna can be satisfactorily kept.

The antenna base may include an edge portion disposed vertically from the bottom surface portion, and the elastic support portion is connected to the edge portion.

Consequently, the elastic support portion is connected to the edge portion disposed vertically from the bottom surface portion. A distance of a ground path can be decreased, and hence, deterioration of the antenna properties related to the ground path can be reduced.

The antenna element may include the slit.

Consequently, the antenna element includes the slit. The number of the types of usable frequency bands can be increased, and the number of the frequency bands for use in the antenna device for the vehicle can be increased as compared with a time when the antennal element does not include any slits.

The antenna element may be for use in telematics.

Consequently, the antenna device for the vehicle can support the telematics.

EXPLANATION OF REFERENCES

1 vehicle
3 roof
5 recess
7 lid
10 antenna device for vehicle
12 slot
14 slit
20 connector portion
100 antenna base
102 bottom surface portion
104 edge portion
200 circuit board
202, 212 electronic circuit arrangement portion
204, 214 ground pattern
206 power feeding line
208 antenna matching circuit
220 spring
300 intermediate cover
400 antenna element
410 first antenna element
420 second antenna element
430 power feeding element
500 exterior cover

The invention claimed is:

1. An antenna device for a vehicle comprising:

an antenna base including a bottom surface portion;

a circuit board disposed above the bottom surface portion to face the bottom surface portion;

an antenna element disposed on an outer periphery of the antenna base, and forming a slot antenna with a side end of the antenna base being a facing side of a slot;

a power feeding element whose one end portion is connected to the antenna element and whose another end portion is connected to the circuit board, the power feeding element being a flat plate formed in an L-shape; and an elastic support portion that elastically supports the circuit board to the bottom surface portion, wherein the antenna element and the power feeding element are formed integrally, and the power feeding element extends from the one end portion in a first direction parallel to the circuit board, and is then bent toward a second direction perpendicular to the circuit board to be connected to the other end portion, the elastic support portion is made of a metal, and a ground pattern of the circuit board and the antenna base are electrically connected via the elastic support portion.

2. The antenna device for the vehicle according to claim 1, wherein the circuit board includes an antenna matching circuit, and the antenna matching circuit is disposed close to a power feeding portion of the antenna element.

3. The antenna device for the vehicle according to claim 1, wherein the antenna element includes:

a first antenna element disposed on a first direction side; and a second antenna element disposed on a second direction side opposite to the first direction side.

4. The antenna device for the vehicle according to claim 1, wherein the circuit board includes a power feeding line, an electronic circuit arrangement portion, and a ground pattern, and the power feeding line electrically connects the electronic circuit arrangement portion and the antenna element.

5. The antenna device for the vehicle according to claim 1, wherein an interval between a power feeding portion of the antenna element and a portion where the circuit board and the elastic support portion come into contact with each other is 3 cm or less.

6. An antenna device for a vehicle comprising:

an antenna base including a bottom surface portion;

a circuit board disposed above the bottom surface portion to face the bottom surface portion;

an antenna element disposed on an outer periphery of the antenna base, and forming a slot antenna with a side end of the antenna base being a facing side of a slot;

a power feeding element whose one end portion is connected to the antenna element and whose another end portion is connected to the circuit board, the power feeding element being a flat plate formed in an L-shape; and an elastic support portion that elastically supports the circuit board to the bottom surface portion, wherein the antenna element and the power feeding element are formed integrally, the power feeding element extends from the one end portion in a first direction parallel to the circuit board, and is then bent toward a second direction perpendicular to the circuit board to be connected to the other end portion, the antenna base includes an edge portion disposed vertically from the bottom surface portion, and the elastic support portion is connected to the edge portion.

7. The antenna device for the vehicle according to claim 1, wherein the antenna element includes a slit.

8. The antenna device for the vehicle according to claim 1, wherein the antenna element is for use in telematics.

9. An antenna device for a vehicle comprising:

an antenna base including a bottom surface portion;

a circuit board disposed above the bottom surface portion to face the bottom surface portion;

an antenna element disposed on an outer periphery of the antenna base, and forming a slot antenna with a side end of the antenna base being a facing side of a slot; and a power feeding element whose one end portion is connected to the antenna element and whose another end portion is connected to the circuit board, the power feeding element being a flat plate formed in an L-shape, wherein the antenna element and the power feeding element are formed integrally, the power feeding element extends from the one end portion in a first direction parallel to the circuit board, and is then bent toward a second direction perpendicular to the circuit board to be connected to the other end portion, wherein the slot is at least one continuous slot in at least one horizontal corner of the antenna device, wherein the antenna device is configured to be installed in a roof of the vehicle, and wherein the at least one horizontal corner of the antenna device is located in a plane that is substantially parallel to the roof of the vehicle.

* * * * *